US011379571B2

(12) United States Patent
 Schmitz

(10) Patent No.: US 11,379,571 B2
(45) Date of Patent: Jul. 5, 2022

(54) PRESENCE TERMINAL-BASED SIDE CHANNEL COMMUNICATIONS

(71) Applicant: HEWLETT PACKARD ENTERPRISE DEVELOPMENT LP, Houston, TX (US)

(72) Inventor: Christoph L. Schmitz, Houston, TX (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 195 days.

(21) Appl. No.: 16/509,662

(22) Filed: Jul. 12, 2019

(65) Prior Publication Data

US 2021/0011991 A1 Jan. 14, 2021

(51) Int. Cl.
 G06F 21/44 (2013.01)
 G06F 21/60 (2013.01)
 H04L 9/32 (2006.01)
 H04L 9/08 (2006.01)
 G06F 21/85 (2013.01)

(52) U.S. Cl.
 CPC ............ G06F 21/44 (2013.01); G06F 21/602 (2013.01); G06F 21/85 (2013.01); H04L 9/0869 (2013.01); H04L 9/3236 (2013.01); H04L 9/3263 (2013.01)

(58) Field of Classification Search
 CPC ........ G06F 21/44; G06F 21/602; G06F 21/60; G06F 21/85; G06F 21/30; G06F 21/82; G06F 21/70; G06F 13/4282; H04L 9/3263; H04L 9/32; H04L 9/3236; H04L 9/3265; H04L 9/06; H04L 9/0643; H04L 9/0662
 See application file for complete search history.

(56) References Cited

U.S. PATENT DOCUMENTS

| 6,327,688 | B1 * | 12/2001 | Stolitzka | G06F 11/10 714/18 |
| 9,762,547 | B2 | 9/2017 | Binder | |
| 10,211,990 | B2 | 2/2019 | Nairn et al. | |
| 10,242,176 | B1 * | 3/2019 | Sathyanarayana | G06F 13/42 |
| 10,608,819 | B1 * | 3/2020 | Brown | H04L 9/3215 |
| 10,862,900 | B2 * | 12/2020 | Jreij | G06F 13/4282 |

(Continued)

FOREIGN PATENT DOCUMENTS

WO WO-2018214487 11/2018

OTHER PUBLICATIONS

Muhammad Tayyab, "Authenticating the Sender on Can Bus Using Inimitable Physical Characteristics of the Transmitter and Channel," 2018, pp. 1-83, University of Michigan-Dearborn, USA.

*Primary Examiner* — Shaqueal D Wade-Wright
(74) *Attorney, Agent, or Firm* — Trop, Pruner & Hu, P.C.

(57) ABSTRACT

A method includes a controller detecting a signal state of a presence terminal that is associated with a bus device. The signal state is set by the bus device to indicate presence of the bus device in a connector, and the connector is connected to a bus. The method includes the controller communicating data over the bus; and in response to detecting the signal state, the controller communicating side channel data to the bus device to authenticate the data that is communicated over the bus as being provided by the controller. Communicating the side channel data with the bus device includes providing a signal to the presence terminal, which represents the side channel data.

17 Claims, 8 Drawing Sheets

(56) References Cited

U.S. PATENT DOCUMENTS

| | | | |
|---|---|---|---|
| 2004/0133728 A1* | 7/2004 | Ellerbrock | H04L 12/40032 710/305 |
| 2009/0234998 A1* | 9/2009 | Kuo | G06F 13/4291 710/110 |
| 2017/0153997 A1* | 6/2017 | Chiu | G06F 13/404 |
| 2018/0013779 A1* | 1/2018 | Aguayo Gonzalez | H04L 63/0876 |
| 2018/0262327 A1 | 9/2018 | Jain | |

* cited by examiner

PRESENCE TERMINAL-BASED SIDE CHANNEL COMMUNICATIONS

BACKGROUND

Buses are ubiquitous in modern computer systems. In general, a bus is a communication subsystem that adheres to a particular communication standard and over which bus end point devices (or "bus devices") may communicate data. A bus may be contained within a single computer or may extend across multiple computers. For some bus types, the bus devices may have an associated hierarchy in which one bus device is a master, or "superior," bus device and other bus devices are slave, or "subordinate," bus devices. The superior bus device may communicate control messages to the subordinate bus devices over the bus for such purposes as taking inventory of the subordinate bus devices, determining statuses of the subordinate bus devices and configuring the subordinate bus devices.

DETAILED DESCRIPTION

Figure 1:
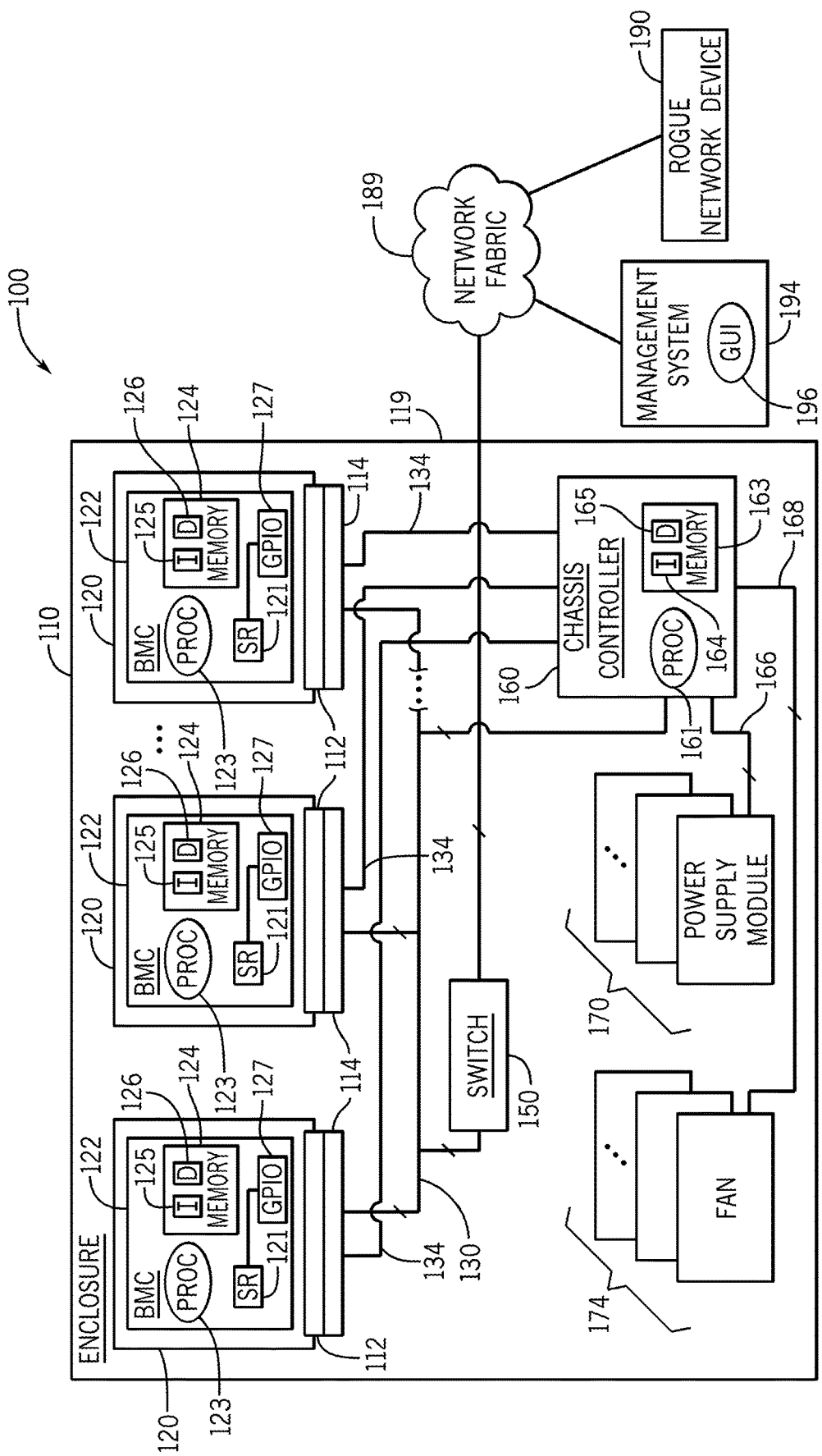
FIG. 1 is a schematic diagram of a computer system illustrating a blade enclosure of the computer system according to an example implementation.

A computer system may have a bus with an associated bus device hierarchy for bus device endpoints (or "bus devices") that are connected to and communicate over the bus. Pursuant to this hierarchy, the bus devices may include a master, or "superior," bus device (e.g., an active superior bus device and possibly one or multiple backup superior bus devices) and one or multiple slave, or "subordinate," bus devices. The superior bus device may transmit control messages to the subordinate bus devices via the bus for such purposes as taking an inventory, determining device statuses, configuring the subordinate bus devices, and so forth.

As a more specific example, in accordance with some implementations, the computer system may include a cabinet, or enclosure (e.g., a blade enclosure, for example), that is constructed to form mechanical and electrical connections with removable subordinate bus devices. In accordance with example implementations, the subordinate bus device may be a modular circuit card assembly, such as a blade (e.g., a server blade, a networking blade or a storage blade), an expansion bus card, and so forth. As a more specific example, the computer system may include a blade enclosure that contains blade connectors in which blades (i.e., subordinate bus devices) may be installed and removed.

In accordance with example implementations, a blade may be installed in a blade connector by hot plugging the blade into the connector, and an installed blade may be removed from a blade connector by hot unplugging the blade from the connector. In this context, "hot plugging" refers to the installation of a blade in a blade connector without removing power from the blade connector, and "hot unplugging" refers to the removal of an installed blade from a blade connector without removing power from the blade connector. As further described herein, each connector may have a presence terminal (e.g., a presence pin of the connector), which the blade asserts when the blade is installed in the connector for purpose of informing the superior bus device to the blade's presence.

The blade connector of the blade enclosure may be constructed to mate with a connector of the subordinate bus device for purposes of connecting electrically conductive power and communication lines, or traces, of the enclosure to corresponding electrically conductive power and communication lines, or traces, of the subordinate bus device. For example, in accordance with some implementations, the blade connector may have pins that are constructed to receive corresponding sockets of a mating connector of a subordinate bus device.

The subordinate bus devices and enclosures may take on other forms, in accordance with other implementations. For example, in accordance with further implementations, a computer system may include an enclosure that contains a motherboard or backplane on which card edge connectors are mounted. The card edge connectors allow subordinate bus devices (e.g., expansion cards) to be installed in and removed from the enclosure. For this implementation, the subordinate bus device may contain a substrate that has an edge on which electrical traces are disposed; and the card edge connector may contain a slot to receive the edge of the subordinate bus device. In this manner, when the edge of the subordinate bus device is inserted into the slot of the card edge connector, spring-like contacts of the connector engage the edge-disposed traces of the subordinate device to form corresponding electrical connections.

The superior bus device may take on numerous forms, depending on the particular implementation. As an example, in accordance with some implementations, the superior bus device may be a chassis controller. As another example, in accordance with further implementations, the superior bus device may be a bus root hub (e.g., a PCIe hub).

In the context of this application, a "bus" refers to a communication subsystem that is associated with one or multiple communication standards or protocols for communicating data among a set of bus devices. In this context, a "bus" may include one or more of a data bus, a control bus, a system bus, a power management bus, a telemetry bus, a serial bus, a parallel bus, and so forth. The bus may comply with any of a number of different bus specification standards, depending on the particular implementation. For example, in accordance with some implementations, a bus may be or include a Controller Area Network (CAN) bus over which a CAN bus master device (i.e., the superior bus device) may communicate with one or multiple CAN bus slave devices (i.e., the subordinate bus devices). As an example, the subordinate CAN bus devices may include hot-pluggable components, such as power supplies, fans, compute nodes, interconnects, composer modules and front panels.

As another example, in accordance with example implementations, a bus may be or include a Peripheral Component Interconnect Express (PCIe) bus, in which the superior bus device serves as the PCIe root complex, or hub, which manages a number of subordinate PCIe endpoint bus devices.

In accordance with further example implementations, a bus may be or include an Inter-Integrated Circuit ($I^2C$) bus. For this bus, an $I^2C$ bus master device is the superior bus device, and the $I^2C$ bus master device manages one or multiple subordinate $I^2C$ slave devices via communications over the $I^2C$ bus.

In accordance with further example implementations, a bus may be or include a Universal Serial Bus (USB). A USB host controller (i.e., the superior bus device) may manage one or multiple subordinate USB end points (i.e., the subordinate bus devices) via communications over the USB.

In general, a bus architecture that includes superior and subordinate bus devices may be vulnerable to security attacks from interior and/or exterior rogue bus devices. In this manner, the rogue bus device may either be an internal bus device that is installed in a bus device connector of the enclosure or an external rogue bus device that is located outside of the enclosure. For the latter case, the external rogue bus device may, for example, be connected via networking device components to the bus.

As an example, a rogue bus device may orchestrate a man-in-the-middle (MITM) security attack. In an MITM security attack, a rogue bus device may compel subordinate bus devices to recognize the rogue bus device as being the superior bus device. With this recognition, the rogue bus device may proxy messages to the actual superior bus device, thereby suitably altering message content to achieve malicious goals.

As another example, a rogue bus device may perpetuate a security attack by disabling the actual superior bus device and spoofing the role of the actual superior bus device and its responsibility to all of the subordinate bus devices to achieve malicious goals.

Security attacks, such as the above-described MITM and spoofing attacks, may profoundly impact a computer system and may be devastating to its proper operation. For example, such a security attack may result in the loss of confidentiality due to the rogue bus device's snooping of the subordinate bus device communications. Moreover, a security attack may result in the removal of power from subordinate bus devices, the overheating of subordinate bus devices, disabling of subordinate bus devices, and so forth. The security attack may involve the planting of rogue credentials, key materials or certificates on subordinate bus devices as part of a preliminary phase to additional security attacks that are more targeted and may have wider scopes.

In accordance with example implementations that are described herein, a superior bus device uses side channel-based communications with subordinate bus devices to inhibit, if not prevent, security attacks, such as the ones that are described above. Using side channel-based communications, a superior bus device may communicate data to subordinate bus devices in a secure, trusted manner; and the subordinate bus devices may use this data to authenticate content that is communicated over the bus and appears to be from the superior bus device for purposes of ensuring that this content actually originates with the superior bus device.

More specifically, in accordance with example implementations, pre-existing structure of the computer system, such as hot plugging presence contacts, or terminals (e.g., hot plug presence pins of blade connectors), are used for the side channel communications, and the presence terminals may be connected to the superior bus device in a star topology network. Each connector is associated with a different presence terminal, and as such, a one-to-one association exists among the installed subordinate bus devices and the presence terminals. In accordance with example implementations, the superior bus device serves as the root, or hub, of the star topology network; and the presences terminals are connected to the hub via respective spoke connections to the hub. The presence terminal-based side channel is "out of band" with respect to the bus. In other words, for each of the presence terminal-based side channels, no other bus device (other than the superior bus devices and the subordinate bus device corresponding to the presence terminal) may snoop information that is communicated over the side channel or transmit information to the side channel, as the bus device is not connected to the channel.

Therefore, due to the use of the presence terminal to form a side channel, the presence terminal has dual functions: a subordinate bus device asserts the presence terminal when the subordinate bus device is installed in the connector (the subordinate bus device asserts the presence terminal to "pull" the terminal to have a logic zero value, for example); and upon detecting the presence of the subordinate bus device (due to the subordinate bus device asserting the presence terminal), the superior bus device communicates data to the subordinate bus device via the presence terminal so that the subordinate bus device may use this data to authenticate content that is communicated over the bus.

In the context of this application, the "presence terminal" refers to a contact, trace, or terminal that is associated with a connector and communicates a signal such that an asserted state of the signal represents or indicates that a bus device has been installed (e.g., hot plugged) in the connector. In accordance with example implementations, the presence terminal may be an electrical contact of the connector, such as a pin of the connector.

The data or content that is communicated over the presence terminal-based side channel may vary, depending on the particular implementation. As an example, in accordance with some implementations, the content may be a cryptographic hash value. The superior bus device may, for example, apply a cryptographic hash function to an entire message or to part of a message (that is communicated over the bus) to produce a hash value.

In accordance with example implementations, a "cryptographic hash function" may be a function that is applied, or performed, by a processor executing machine-executable instructions ("software") to receive an input and produce an output (the "hash value") that corresponds to the input. Any minute change to the input may alter the hash value. As examples, the cryptographic hash function may be a secure hash function (SHA), any federal information processing standards (FIPS) approved hash function, any national institute of standards and technology (NIST) approved hash function, or any other cryptographic hash function. Moreover, in accordance with further example implementations, a cryptographic hash function may be a function that is applied, or performed, by a hardware circuit (e.g., an application specific integrated circuit (ASIC), a field programmable gate array (FPGA), and so forth) without executing machine-executable instructions.

In accordance with some implementations, the subordinate bus device may apply the cryptographic hash function to a partial/entire message that is received from the bus to determine if the two versions of the hash value agree and thus, authenticate the message as being sent by the superior bus device. In other words, because minute changes alter the hash value, the subordinate bus device may assume that the bus transmitted message did not originate with the superior bus device if the hash values do not agree.

As a more specific example, in accordance with some implementations, the superior bus device may communicate a message over the bus that contains a self-signed certificate that contains a public key (e.g., part of a public key-private key pair) to be used to encrypt/decrypt data that is communicated over the bus. The superior bus device may communicate a hash value over the presence terminal-based side channel, which represents the application of a cryptographic hash function to the certificate. For example, if the certificate is represented by M bits, then, in accordance with an example implementation, the superior bus device may apply a 256 bit Secure Hash Algorithm (SHA256(M)) to the certificate to produce a 256 bit hash value that the superior bus device communicates to the subordinate bus device over the presence terminal-based side channel. The subordinate bus device may then apply the SHA256 hash function to the certificate that was received over the bus and compare the two hash values to authenticate the certificate (e.g., authenticate the certificate as being provided by the superior bus device if the hash values are the same and ignore the certificate otherwise).

In accordance with further example implementations, the superior bus device may apply the SHA256 algorithm to part of the certificate (i.e., apply a SHA256(P) cryptographic hash function, where P is less than M), such as the public key portion of the certificate, to produce a 256 bit hash value that the superior bus device communicates to the subordinate bus device over the presence terminal-based side channel. The subordinate bus device may then apply the SHA256 hash function to part of the certificate (e.g., the public key portion) that was received over the bus and compare the two hash values to authenticate the certificate.

In accordance with further example implementations, a cryptographic hash function other that the SHA256 hash function may be used.

The superior bus device may, in accordance with a further example implementation, communicate a message over the bus that contains a certificate chain (e.g., an X.509 Public Key Infrastructure (PKI) certificate chain). A certificate chain is an ordered set of certificates, in which each certificate in the chain is signed by the entity that is identified by the next certificate in the chain. The certificate chain terminates with the root certificate authority (CA) certificate. The superior bus device may apply a cryptographic hash function to the entire certain certificate chain or a portion of the certificate chain to produce a hash value, which the superior bus device communicates to the subordinate bus device via the presence terminal-based side channel. The subordinate bus device may then apply the same cryptographic hash function to the whole/partial certificate chain received from the bus and compare the two hash values to authenticate the certificate chain. It is noted this technique prevents a spoofing or MITM attack, even if the root CA certificate is compromised.

As another example, in accordance with other implementations, the superior bus device may communicate data over the presence terminal-based side channel, which represents a symmetric key. Bus messages that are sent by the superior bus device to the subordinate bus device may be encrypted using this symmetric key. Not only may the subordinate bus device use the symmetric key to authenticate the bus communicated messages as being sent by the superior bus device, information may be exchanged over the bus without fear that a rogue bus device may spoof or intercept this information.

In accordance with further example implementations, the superior bus device may generate an identifier, communicate data representing the identifier to the subordinate bus device over the presence terminal-based side channel to the subordinate bus device, and embed the same identifier in messages that are sent by the superior bus device to the subordinate bus device. In this way, the subordinate bus device may authenticate bus communicated messages based on whether the identifiers match.

In accordance with example implementations, the identifier may be a number that is generated in an arbitrary manner by the superior bus device.

More specifically, in accordance with example implementations, the superior bus device may contain a pseudorandom or random number generator to generate a number to be included in bus communicated messages and communicated to the subordinate bus device via the presence terminal. In this context, a "pseudorandom number" may be a nearly random number, and in accordance with example implementations, the superior bus device may include a pseudorandom number generator. For example, the pseudorandom random number generator may be a seed-based generator, which provides a pseudorandom number at its output. The superior bus device may then communicate this pseudorandom number to a given subordinate bus device via the presence terminal-based side channel and embed the pseudorandom number in messages that are communicated to the given subordinate bus device over the bus.

As a more specific example, in accordance with some implementations, the superior bus device may include a polynomial-based pseudorandom number generator. This generator provides a pseudorandom number that is based on a seed value that serves as an input to a polynomial function. As examples, the seed value may be derived from a state or condition at the time the pseudorandom number is to be generated, such as input provided by real time clock (RTC) value, a counter value, a measured noise value, a register value, and so forth. The polynomial-based generator receives the seed value as an input, applies a polynomial function to the seed value and provides an output (digital data, for example) that represents the pseudorandom number.

In accordance with further example implementations, the superior bus device may have an actual, or true, random number generator. This generator provides an output that represents a true random number, which the superior bus device communicates to a given subordinate bus device via the presence terminal-based side channel; and the superior bus device also embeds the same true random number in bus messages that are sent to the given subordinate bus device bus. As an example, the true random number generator may include an analog-to-digital converter (ADC) that provides a random digital output; and the ADC may sample a truly random analog signal, such as a thermal noise signal (a Johnson-Nyquist noise signal that is provided by a resistor, for example) or an atmospheric noise signal that is received by an antenna.

In general, side channels may be relatively expensive to implement. However, due to the dual functions of the presence terminal (i.e., the use of the presence terminal to both indicate or represent the presence of the subordinate bus device in the connector and the use of the presence terminal for side channel communications), implementation costs associated with the side channel communication techniques that are described herein may be relatively minimal. Moreover, because the messages (e.g., messages representing hash values, keys, numbers, and so forth) that are communicated over the presence terminal side channels have associated relatively small sizes, the presence terminal-based side channel communication has a relatively small associated bandwidth.

Referring to FIG. 1, as a more specific example, in accordance with some implementations, a computer system 100 includes a cabinet, or enclosure 110, such as, for example, a blade enclosure, which has blade connectors 114 that are mounted to a printed circuit board substrate 119 (e.g., a motherboard or backplane) of the enclosure 110. As depicted in FIG. 1, each connector 114 is constructed to receive a mating connector 112 of a circuit card-based module so that the electrical contacts, or terminals (e.g., sockets) of the connector 112 mechanically engage and electrically connect to corresponding contacts or terminals (e.g., pins) of the connector 114. In accordance with example implementations, the circuit card-based module is a subordinate bus device 120, such as a blade (e.g., a storage blade, a server blade, a networking blade, and so forth). The subordinate bus device 120 contains a controller that may perform bus and side channel communications (as described herein), as well as assert a presence terminal (not depicted in FIG. 1) of the blade connector 114 when the subordinate bus device 120 is present in the blade connector 114. For example implementations that are described herein, the controller of the subordinate bus device 120 may be a Baseboard Management Controller (BMC) 122.

Moreover, in accordance with example implementations, the enclosure 110 includes a superior bus device, which, in accordance with example implementations, is a chassis controller 160. In accordance with some implementations, the chassis controller 160 may be one of a set of available chassis controllers such that a single chassis controller is active at a given time, with one or more additional chassis controllers being available for redundancy purposes.

In general, the BMC 122 asserts the presence terminal of the connector 114 when the subordinate bus device 120 is present in the connector 114 for purposes of alerting the chassis controller 160 to the presence of the subordinate bus device 120. For the example implementation that is depicted in FIG. 1, the individual presence terminals of the connectors 114 are connected to presence terminal communication lines 134 that serve as spokes of a star topology network, with the chassis controller 160 serving as the hub of this star topology network. In general, the subordinate bus devices 120 and the chassis controller 160 communicate over a bus 130 (e.g., a bus that may include one or multiple buses, such as a CAN bus, a PCIe bus, an I²C bus, a USB, and so forth). In this communication over the bus 130, the chassis controller 160 functions in a superior bus device role by communicating control messages to the BMCs 122 of the subordinate bus devices 120.

In accordance with example implementations, due to the star network topology, each presence terminal communication line 134 has strictly two endpoints (the chassis controller 160 and one of the subordinate bus devices 120), thereby creating a secure side channel for the chassis controller 160 to communicate relatively low bandwidth and trusted data (e.g., hash values, keys, numbers and so forth) to the subordinate bus device 120. As described herein, the BMC 122 may use the data that is communicated over this side channel to authenticate relatively higher bandwidth data (e.g., control messages, public keys, public key certificates, portions of certificates and certificate chains, and so forth), which is communicated over the bus 130. In other words, the BMC 122 may use the side channel data to authenticate the bus messages, i.e., verify that bus communicated messages that appear to be sent by the chassis controller 160 to the subordinate bus device 120 are actually sent by the chassis controller 160.

In accordance with example implementations, the bus 130 may be connected to an environment outside of the enclosure 100. For example, as depicted in FIG. 1, a network switch 150 may connect the bus 130 to network fabric 189 for purpose of allowing a remote management system 194 to interface with the chassis controller 160. In this manner, the chassis controller 160 may provide a management interface, which allows information technology (IT) personnel (via one or multiple graphical user interfaces (GUIs) 196) to monitoring the status of the enclosure 110 (e.g., monitoring the blade inventory, receive error messages, and so forth) and take actions (e.g. shut down blades, configure blades, and so forth). As an example, the network switch 150 may be part of a blade that is inserted into its own connector 114 and connected to the bus 130. As also depicted in FIG. 1, a rogue network device 190 may be connected to the bus 130 through the network fabric 189. Alternatively, a rogue network device may be physically installed inside the enclosure 110 in one of the connectors 114. Whether inside or outside the enclosure 110, a rogue network device may, via its access to the bus 130, may attempt to perpetrate security attacks, such as the above-described MITM and/or spoofing attacks. However, such a rogue network device does not have access to the presence terminal communication lines 134; and due to the techniques and systems that are described herein, side channel communications using the presence terminal communication lines 134 may be used to thwart any such attacks.

As used herein, a BMC is a specialized service processor that monitors the physical state of a server or other hardware (e.g., hardware of the subordinate bus device 120) using sensors and communicates with a management system through a management network (e.g., a management network that includes, for example, the bus 130). The BMC may also communicate with applications executing at the OS level through an input/output controller (IOCTL) interface driver, a Representational state transfer (REST) application program interface (API), or some other system software proxy that facilitates communication between the BMC and applications. The BMC may have hardware level access to hardware devices located in a server chassis including system memory. The BMC may be able to directly modify the hardware devices. The BMC may operate independently of the OS of the system in which the BMC is disposed. The BMC may be located on the motherboard or main circuit board of the server or other device to be monitored. The fact that a BMC is mounted on a motherboard of the managed server/hardware or otherwise connected or attached to the managed server/hardware does not prevent the BMC from being considered "separate" from the server/hardware. As used herein, a BMC has management capabilities for sub-systems of a computing device, and is separate from a processing resource that executes an OS of a computing device. The BMC is separate from a processor, such as a central processing unit, executing a high level OS or hypervisor on a system.

In accordance with some implementations, the BMC 122 includes one or multiple processors 123. In this context, a "processor" refers to a central processing unit (CPU) semiconductor package, a CPU processing core, and so forth. In accordance with some implementations, the BMC 122 may be a microcontroller, which has volatile memory, non-volatile memory and a CPU processing core.

The BMC 122, in accordance with example implementations, includes a memory 124. In general, the memory 124 may represent volatile memory, non-volatile memory or a combination of volatile and non-volatile memories that may be formed from a combination of non-transitory memory storage devices (semiconductor storage devices, memristors, phase change memory devices, a combination of storage devices selected from more than one of the storage technologies, and so forth). In general, the memory 124 may store machine executable instructions 125 (or "software"), which are executed by one or multiple processors 123 of the BMC 122 for purposes of causing the BMC 122 to perform one or multiple functions that are described herein. In particular, as further described herein, through the execution of the instructions 125, the BMC 122 may control the assertion of a presence terminal to indicate presence of the subordinate bus device 120 in the connector 114, receive multiple bit messages from the chassis controller 160 via the corresponding presence terminal communication line 134, and assert the presence terminal to acknowledge receipt of a message from the chassis controller 160. In accordance with further example implementations, the BMC 122 may perform one or multiple of these functions in whole or in part by using hardware of the BMC 122 that does not execute machine executable instructions, such as an ASIC, an FPGA, and so forth.

For example implementations that are described herein, the BMC 122 includes a general purpose input/output (GPIO) interface 127 that, when the subordinate bus device 120 is installed in a connector 114, is coupled to a presence terminal of the connector 114 (and coupled to the corresponding presence terminal communication line 134). In accordance with example implementations, the GPIO interface 127 may be programmed by the BMC 122 to be either an input or an output so that the presence terminal is correspondingly configured to be an input or output. As further described herein, when the GPIO interface 127 is configured to be an output, the BMC 122 may control the asserted state of the presence terminal for purposes of asserting the presence terminal (e.g., pulling the presence terminal "low") to indicate presence of the subordinate bus device 120 in the connector 114. Moreover, as further described herein, the BMC 122 may, when the GPIO interface 127 is configured as an output, assert the presence terminal to acknowledge receipt of a message from the chassis controller 160.

When the GPIO interface 127 is configured to be an input, the BMC 122 may receive one or multiple, multiple bit messages from the chassis controller 160, which are communicated over the presence terminal communication line 134. For this purpose, in accordance with some implementations, the BMC 122 includes a shift register 121 that has an input that is coupled to the GPIO interface 127 to serially receive bits into the register 121. The BMC 122 may read the contents of the register 121 for purposes of extracting message content and determining whether errors occurred with message transmissions, as further described herein.

In accordance with example implementations, the GPIO interface 127 may, in addition to be programmed to be an input or output, may also be programmable to have a pulldown state (a state in which the GPIO interface 127 is an output and pulls the presence terminal low) or a pullup state (a state in which the GPIO interface 127 is an output and pulls the presence terminal high).

As used herein, a "chassis controller" (or "chassis management controller") is a specialized service processor (e.g., an embedded processor) that, in general, manages and reports on the operation of a computer environment (such as here, enclosure 110), which may have multiple servers, storage devices, and networking devices (such as the subordinate bus devices 120). The chassis controller may operate independently of the OS of the system (the system of the enclosure 110, for example) in which the chassis controller is disposed. The chassis controller may be located on the motherboard or main circuit board of the server or other device to be monitored. The fact that a chassis controller is mounted on a motherboard of the managed server/hardware or otherwise connected or attached to the managed server/hardware does not prevent the chassis controller from being considered "separate" from the server/hardware. As used herein, a chassis controller has management capabilities for sub-systems of a computing device, and is separate from a processing resource that executes an OS of a computing device. The chassis controller is separate from a processor, such as a central processing unit, executing a high level OS or hypervisor on a system.

In general, the chassis controller 160 may perform such functions as detecting hot plugging and un-plugging of subordinate bus devices 120; maintaining an inventory of components of the enclosure 110; providing a management interface for the remote management system 194; sending error messages and other alerts to the remote management system 194; configuring components of the enclosure 110, such as the subordinate bus devices 120; providing a mechanism to allow remote powering up and powering down of subordinate bus devices; sensing environmental and other operating parameters of the enclosure; and communicating status and alert messages to the management system 194. The chassis controller 160 may manage components of the enclosure 110, other than the subordinate bus devices 120. For example, depending on the particular subordinate bus devices 120 that are present and the power demanded by the devices 120, the chassis controller 160 may control (via communication lines 166) the number of active power supply modules 170 to regulate the available power and control (via communication lines 168) fans 174 to regulate the air flow through the enclosure 110. In accordance with example implementations, the chassis controller 160 may be mounted to the printed circuit board substrate 119.

In accordance with example implementations, the chassis controller 160 may include one or multiple processors 161 as well as a memory 163. The memory 163 may include volatile memory, non-volatile memory or a combination of volatile and non-volatile memories, which may be formed from one or multiple storage devices (semiconductor storage devices, memristors, phase change memory devices, a combination of storage devices selected from more than one of the storage technologies, and so forth). Moreover, the memory 163 may store machine executable instructions 164 and data 165. The machine executable instructions 164, when executed by the processor(s) 161, may cause the processor(s) 161 to perform one or multiple functions for the chassis controller 160, as further described herein. Moreover, similar to the BMC 122, in accordance with further example implementations, one or multiple functions of the chassis controller 160 may be performed by a dedicated hardware that does not execute instructions, such as an ASIC, an FPGA, and so forth. In accordance with some implementations, the chassis controller 160 may be a microcontroller, which has volatile memory, non-volatile memory and a CPU processing core.

Figure 2:
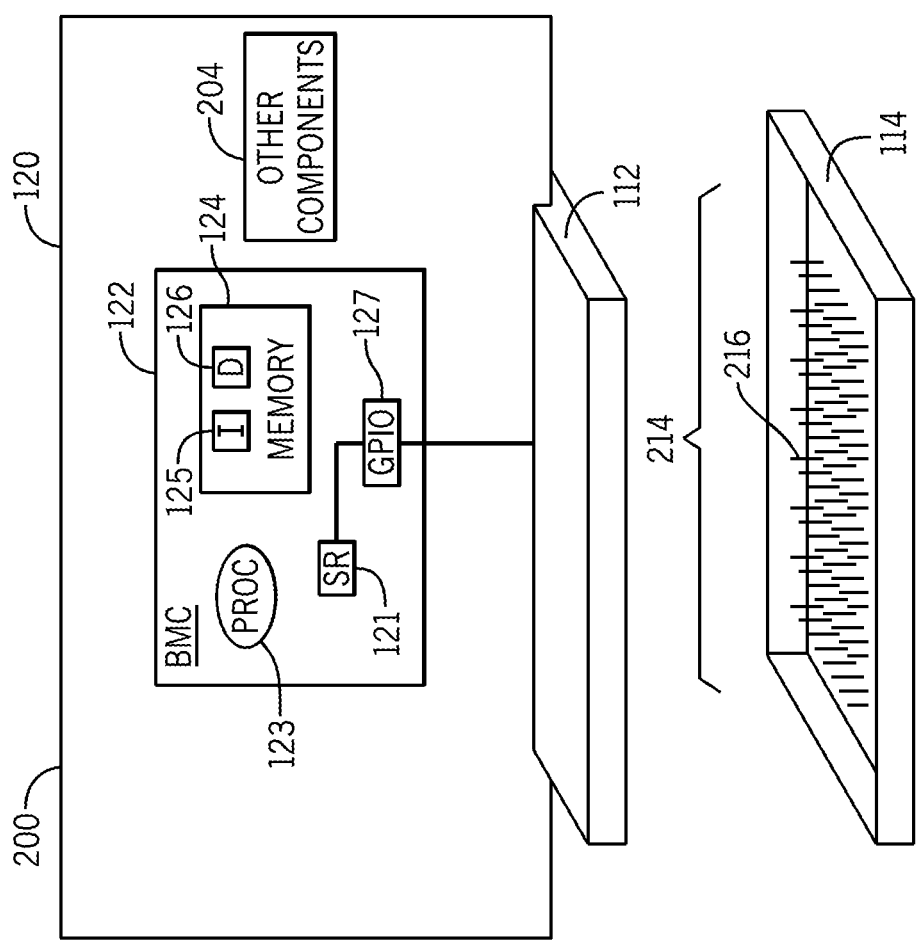
FIG. 2 is an exploded perspective view of a connection between a subordinate bus device and a blade connector according to an example implementation.

Referring to FIG. 2, in conjunction with FIG. 1, in accordance with example implementations, the subordinate bus device 120 may include a printed circuit board substrate 200 onto which components of the subordinate bus device 120 are mounted, such as, for example, the BMC 122, among other components 204 (e.g., CPUs, memory devices, mass storage devices, and so forth). Moreover, the connector 112 may be mounted near or at an edge of the substrate 200, as shown in FIG. 1. In accordance with some implementations, the connector 114 may have a set of pins 214 that are constructed to be received in corresponding sockets (not shown) of the connector 112. The set of pins 214 may include, in accordance with example implementations, pins to communicate control, address and data signals with the bus 130. Moreover, in accordance with example implementations, the set of pins 214 includes a presence pin 216 (i.e., a presence terminal) that is connected to the presence pin communication line 134 that corresponds to the connector 114. The BMC 122, in response to the subordinate bus device 120 being installed in the connector 114, powers up, and then the BMC 122 asserts (e.g., pulls low) the presence pin 216 to signal the chassis controller 160 that the subordinate bus device 120 has been installed. As further described herein, in accordance with example implementations, the assertion of the presence pin 216 may further trigger the chassis controller 160 to communicate a message to the subordinate bus device 120 via the presence pin 216.

The presence pin 216 is one example of an electrical contact, or terminal, or contact, which may be asserted by a subordinate bus device to indicate or represent that the subordinate bus device has been installed in a bus device connector. Other types of contacts, or terminals, may be used as a "presence terminal" for signaling installation of a bus device in a connector, in accordance with further implementations. For example, in accordance with another implementation, the pins and sockets of the connectors 112 and 114 may be juxtaposed, and with this arrangement, a socket of the connector 114 may be asserted by the BMC 122 to indicate or represent installation of the subordinate bus device 120 in the connector 114. As another example, in accordance with some implementations, the subordinate bus device may be an expansion bus card having card edge-disposed electrical traces that are engaged by spring-like electrical contacts of a connector; and one of these spring-like electrical contacts of the connector may be asserted by the BMC 122 to or represent installation of the subordinate bus device 120 in the connector. Thus, in general, the subordinate bus device may assert a presence terminal to represent or indicate insertion of the subordinate bus device in a connector, and the presence terminal may take on one of many different forms. Moreover, regardless of the form of the presence terminal, the chassis controller 160 may use the presence terminal as a sideband channel to communicate multiple data bit data messages to the subordinate bus device 120.

Figure 3:
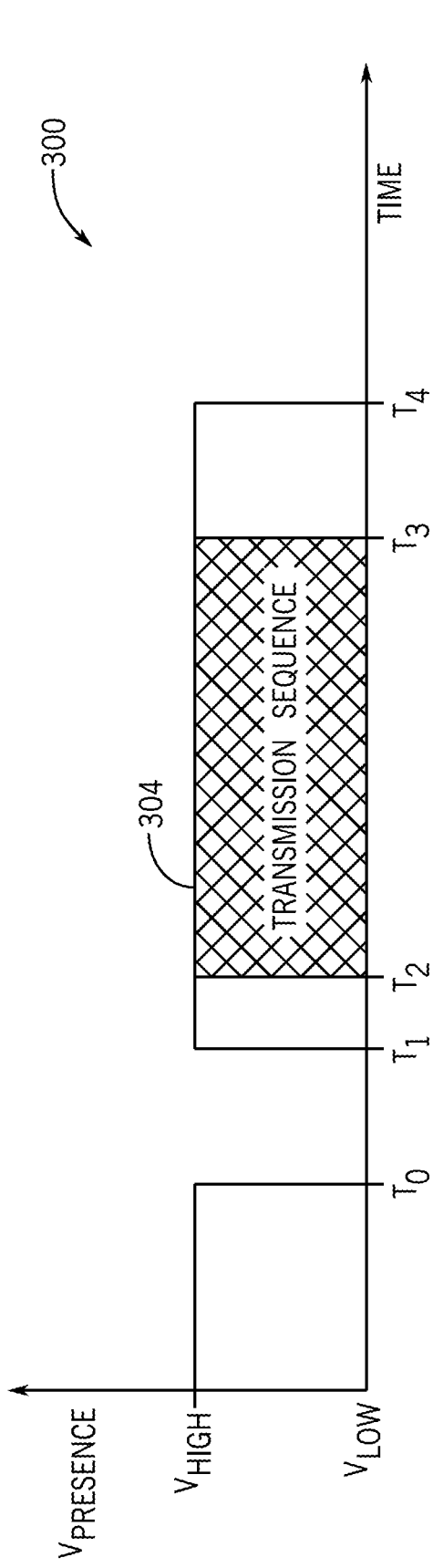
FIG. 3 is a waveform of a subordinate bus device presence terminal illustrating the communication of data with a subordinate bus device via the presence terminal according to an example implementation.

FIG. 3 is a waveform 300 illustrating signaling that may occur on a presence terminal (such as the presence pin 216 depicted in FIG. 2) corresponding to insertion of the subordinate bus device 120 into the connector 114 and the subsequent transmission of a message from the chassis controller 160 to the subordinate bus device 120 using the presence terminal-based side channel. Referring to FIG. 3 in conjunction with FIG. 1, the presence terminal has a voltage (called "$V_{PRESENCE}$" in FIG. 3). For this example, it is assumed that the $V_{PRESENCE}$ voltage is pulled high (to a voltage level called "$V_{HIGH}$" in FIG. 3) in its de-asserted state by a bus pullup resistor; and for this example, it is assumed that initially that the connector 114 is empty, allowing the $V_{PRESENCE}$ voltage to be pulled to the $V_{HIGH}$ voltage by the bus pullup resistor. For this example, slightly before time $T_0$, the subordinate bus device 120 is inserted into the connector 114, and at time $T_0$, the BMC 122 of the subordinate bus device 120 pulls the $V_{PRESENCE}$ voltage low to set the presence terminal to an asserted state, i.e., the BMC 122 pulls the $V_{PRESENCE}$ voltage to a $V_{LOW}$ voltage.

At time $T_1$, the BMC 122 de-asserts the presence terminal, which allows the $V_{PRESENCE}$ voltage to be pulled high by the bus pullup resistor and configures the GPIO interface 127 to "listen" for a transmission sequence 304 from the chassis controller 160. In accordance with some implementations, the BMC 122 measures a delay (called "$T_{PRES}$" herein) before monitoring for the transmission sequence 304 from the chassis controller 160. The $T_{PRES}$ delay provides a synchronization mechanism between the chassis controller 160 and the BMC 122. For this example, $T_{PRES}$ delay expires before time $T_2$, and the BMC 122 accordingly begins listening for the transmission sequence 304 over the presence terminal. As also depicted in FIG. 3, from time $T_2$ to time $T_3$, the chassis controller 160 provides the transmission sequence 304, which propagates over the presence communicate line 134 to the presence terminal.

The BMC 122 may detect bit transitions in a number of different ways. For example, in accordance with some implementations, the BMC 122 may receive software interrupts in response to bit level transitions on the presence terminal; and in accordance with further implementations, the BMC 122 may poll the presence terminal to detect the bits of the transmission sequence 304. Assuming, for this example, that the transmission and reception of the transmission sequence 304 occurred without any errors, at time $T_4$, the BMC 122 asserts the presence terminal to acknowledge receipt of the transmission sequence 304 to the chassis controller 160. It is noted that if the BMC 122 determines that the transmission sequence 304 was not successfully received (i.e., the BMC 122 detects an error), then, in accordance with example implementations, the BMC 122 may not assert the presence terminal at time $T_4$ as represented in FIG. 3; but rather, the BMC 122 may leave the presence terminal de-asserted to indicate unsuccessful transmission to the chassis controller 160 so that the chassis controller 160 may retry sending the transmission sequence 304 to the BMC 122.

In accordance with example implementations, the transmission sequence 304 is communicated using a single signal that represents both the data for the transmission sequence 304 as well a clock signal that represents the timing of the bits. For example, in accordance with some implementations, the transmission sequence 304 may use an encoding in which the clock signal is encoded into the data, such as an encoding that used the 1-Wire protocol or uses Manchester encoding. The encoding may assume a specific bit rate frequency (e.g., a frequency at or near 9,600 Hz).

Figure 4:
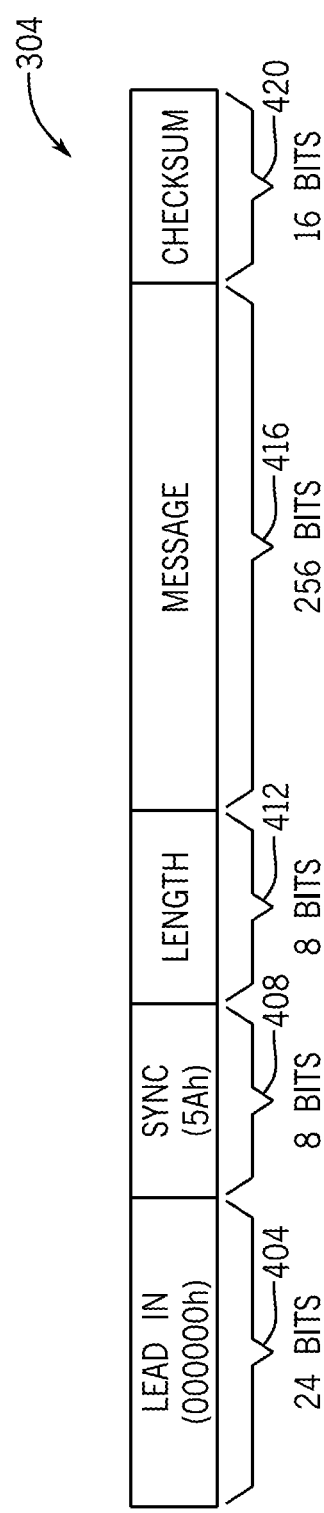
FIG. 4 is an illustration of content of a presence terminal transmission sequence according to an example implementation.

FIG. 4 is an illustration of the content of the transmission sequence 304, in accordance with example implementations. Referring to FIG. 4 in conjunction with FIG. 1, in accordance with example implementations, the transmission sequence 304 includes a lead-in portion 404 (e.g., a 24 bit portion), which may be received by the shift register 121 so that during the lead-in phase, the shift register 121 stays at 00h (where the suffix "h" denotes a hexadecimal representation). The transmission sequence 304 may also include a synchronization portion 408 that immediately proceeds the lead-in portion 404. The synchronization portion has a specified value (here, "5Ah"). Thus, after the lead-in portion 404 is detected, after eight additional shifts of the shift register 121, the shift register 121 should contain the specified value for the synchronization portion 408.

In accordance with example implementations, the synchronization portion 408 is immediately proceeded by a length portion 412, such as a portion of eight bits. After the synchronization portion 408 appears in the shift register 121, then after the next eight shifts of the shift register 121, the length of a message portion 416 of the transmission sequence 304 (corresponding to a length portion 412) appears in the shift register 121. The message portion 416 immediately proceeds the length portion 412 and contains bits that represent a message. A checksum portion 420 (e.g., a 16 bit portion) immediately proceeds the message portion 416. The BMC 122 reads the message bits from the shift register 121 (which may involve multiple reads of the register 121) and stores the message content.

The BMC 122 may use the checksum portion 420 to determine whether the message was successively received or was corrupted. In accordance with some implementations, the checksum portion 420 may allow the detection and correction of a few erroneous message bits (and such, the BMC 122 may deem the communication of the transmission sequence 304 successful and without errors). In accordance with further implementations, the checksum portion 420 may allow the detection but not the correction of erroneous message bits (and such, the BMC 122 may deem the communication of the transmission sequence 304 to be erroneous and take the measures described herein to initiate retransmission of the transmission sequence 304).

In accordance with example implementations, the transmission sequence 304 may not contain more than 300 bits, which translates to approximately 30 to 150 milliseconds (ms) of nominal insert processing. Such a time range may be acceptable for a bus device insertion or removal, which may take several seconds on average.

For purposes of accommodating the issue of a sudden removal of the subordinate bus device 120, which may result in an incomplete transmission of the transmission sequence 304, followed by a multitude of "1" bits of the side channel message, a maximum bit length of the message may be set, in accordance with example implementations. This means that the message information phase may be limited to a small time slice before the BMC 122 declares an error. In addition, the message format affords several checks to allow termination of the message transmission phase early: if the received bits do not correspond to the lead-in zeros in the synchronization pattern, then the message is considered to be corrupt and can be aborted after just thirty bits; and if the length field corresponds to a length that exceeds the maximum message length, then the BMC 122 may declare an error.

In accordance with example implementations, as an error recover strategy, after successful receipt of the side channel message, the BMC 122 asserts the presence terminal in order to revert back to presence detection. If the message is corrupted or not detected at all, then the BMC 122 may allow the presence terminal to remain de-asserted to indicate absence. In accordance with some implementations, the BMC 122 may attempt to initiate a retry after some time (a delay called "$T_{err}$") has elapsed by asserting the presence terminal again for purposes of compelling the chassis controller 160 to retransmit the transmission sequence 304. Moreover, as described herein, the BMC 122 may initiate several such retry attempts.

Figure 5:
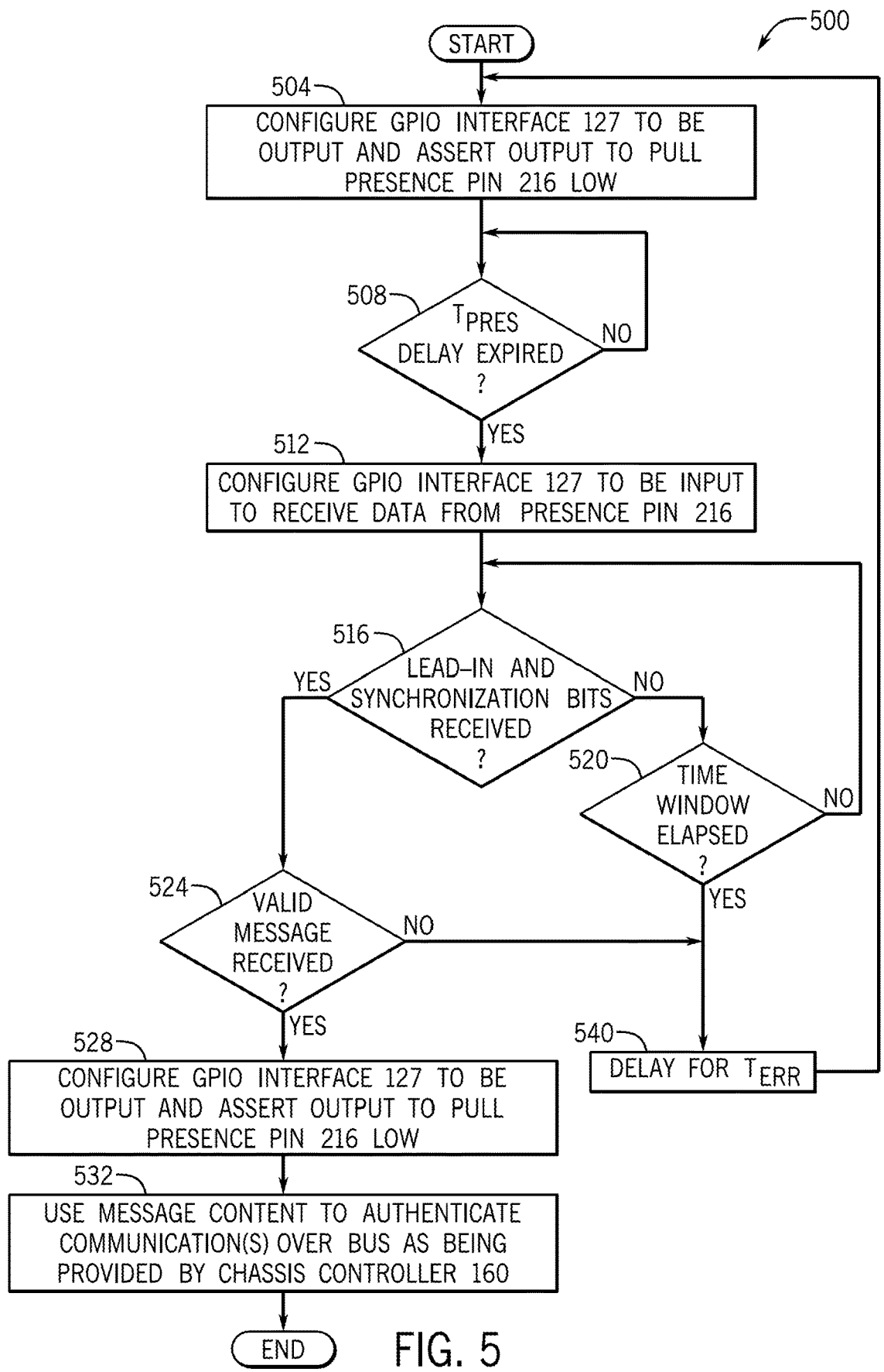
FIG. 5 is a flow diagram depicting a technique used by a subordinate bus device to communicate with a superior bus device using a presence terminal-based side channel according to an example implementation.

FIG. 5 is a flow diagram 500 depicting a technique that may be used by the BMC 122 in accordance with example implementations. For this example, it is assumed that the presence pin 216 (FIG. 2) is the presence terminal. Referring to FIG. 5 in conjunction with FIG. 1, pursuant to the technique 500, the BMC 122 configures (block 504) the GPIO interface 127 to be an output and pulls the presence pin 216 low.

Next, the BMC 122 measures the $T_{PRES}$ delay and upon determination (decision block 508) that the $T_{PRES}$ delay has expired, the BMC 122 prepares to receive the transmission sequence from the chassis controller 160. More specifically, the BMC 122 configures (block 512) the GPIO interface 127 to be an input so that the bits of the transmission sequence may be received into the shift register 121.

If the BMC 122 determines (decision block 516) that the lead-in synchronization bits have not been received, then the BMC 122 evaluates (decision block 520) whether the appropriate time window has elapsed before receiving these bits and continues to wait. Otherwise, an error has occurred, and the BMC 122 delays (block 540) for the $T_{ERR}$ delay interval before returning to block 504 to once again initiate the transmission sequence by pulling the presence pin 216 low.

If, in decision block 516, the BMC 122 determines that the lead-in synchronization bits have been received, then the BMC 122 determines (decision block 524) whether a valid message has been received. If not, control transfers to block 540 to initiate the retransmission, as described above. Otherwise, if a valid message has been received, then the BMC 122 configures the GPIO interface 127 to be an output and pulls the presence pin 216 low, pursuant to block 528. As this point, a valid message has been received, and the BMC 122 may then use the message content to authenticate one or multiple communications over the bus 130 as being provided by the chassis controller 160, as depicted in block 532.

Figure 6:
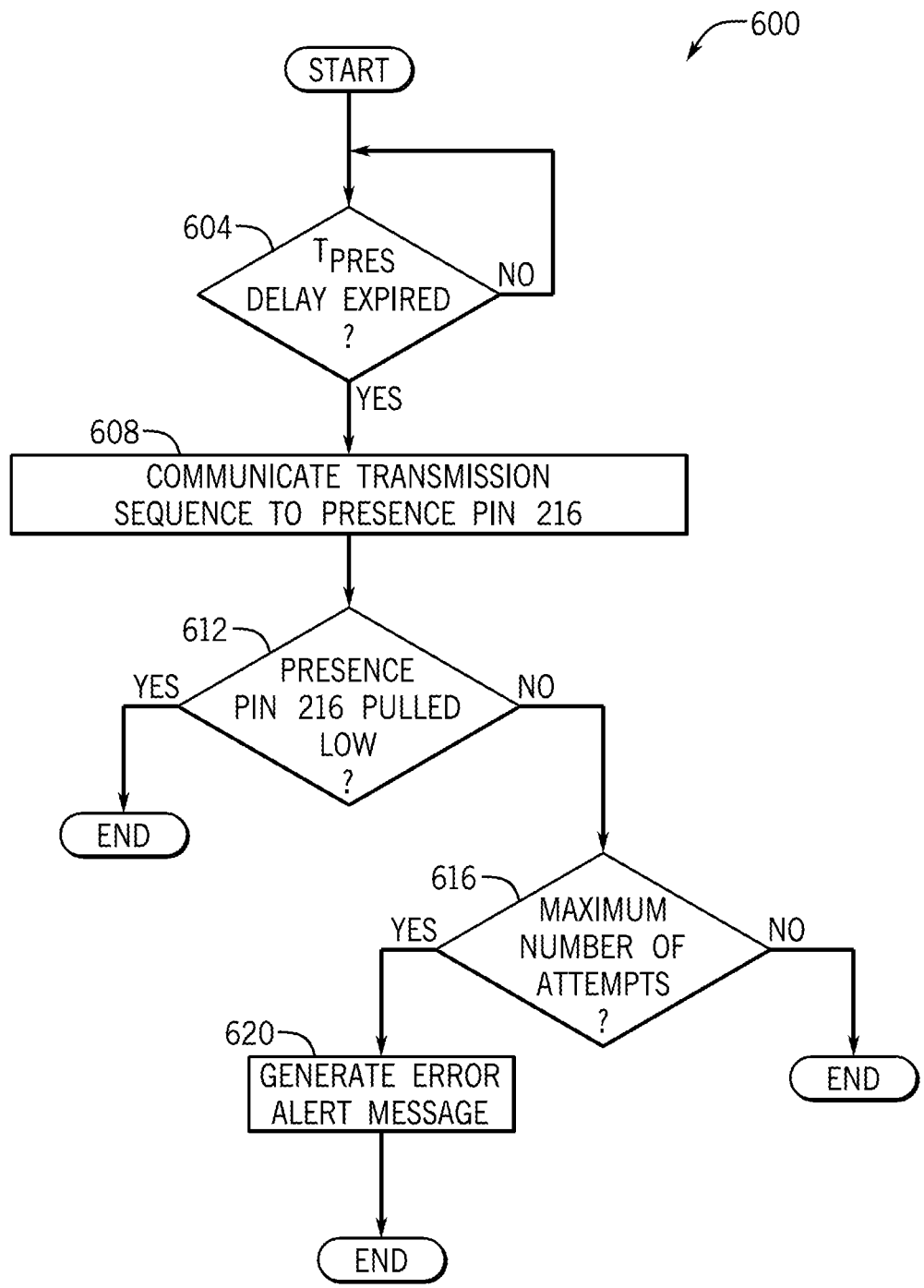
FIG. 6 is a flow diagram depicting a technique used by a superior bus device to communicate with a subordinate bus device using a presence terminal-based side channel according to an example implementation.

FIG. 6 depicts a technique 600 that may be performed by the chassis controller 160 in connection with the transmission of the transmission sequence to the presence pin 216, in accordance with example implementations. In general, the chassis controller 160 may perform the technique 600 in response to detecting assertion of the presence pin 216 by the subordinate bus device 120. As an example, the technique 600 may be performed as an interrupt service routine, which is called when the assertion of the presence pin 216 generates an interrupt.

Pursuant to decision block 604 of the technique 600, the chassis controller 160 determines whether the $T_{PRES}$ delay has expired (i.e., the chassis controller 160 measures the $T_{PRES}$ delay); and if so, the chassis controller 160 communicates (decision block 608) the transmission sequence to the presence pin 216. In accordance with example implementations, the chassis controller 160 next determines whether the message was received by the subordinate bus device 120 by determining (decision block 612) whether the presence pin of the subordinate bus device has been pulled low. If so, then the technique 600 ends, as the transmission was successful. Otherwise, in accordance with example implementations, the chassis controller 160 determines (decision block 616) whether a maximum number of attempts have been attempted with this subordinate bus device. If not, the technique 600 ends and relies on the presence pin signaling by the subordinate bus device 120 to reinitiate the sending of the transmission sequence by the chassis controller 160. Otherwise, if a determination is made (decision block 616) that a maximum number of attempts have been made, then, in accordance with example implementations, the chassis controller 160 generate an error alert message, pursuant to block 620. As an example, in accordance with some implementations, the chassis controller 160 may be in communication with the management system 194 and via the GUI 196, the chassis controller 160 may communicate a message or other indication to alert IT personnel to a communication problem occurring with the corresponding connector 114.

Figure 7:
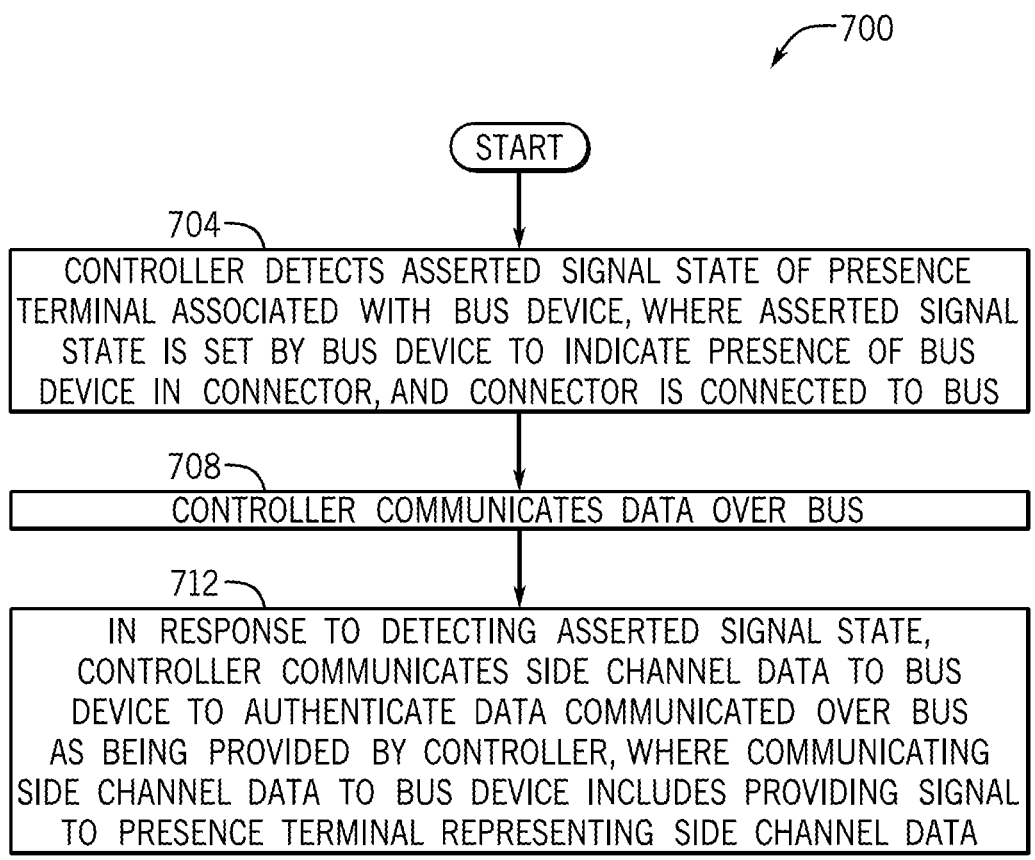
FIG. 7 is a flow diagram depicting a technique used by a controller to communicate with a bus device to authenticate data communicated over a bus as being provided by the controller according to an example implementation.

Referring to FIG. 7, in accordance with example implementations, a technique 700 includes a controller detecting (block 704) a signal state of a presence terminal of a bus device. The signal state is set by the bus device to indicate presence of the bus device in a connector, and the connector is connected to a bus. The technique 700 includes, the controller communicating data over the bus, pursuant to block 708. In response to detecting the signal state, the controller communicates (block 712) side channel data to the bus to authenticate the data communicated over the buses being provided by the controller. Communicating the side channel data with the bus device includes providing a signal to the presence terminal, which represents the side channel data.

Figure 8:
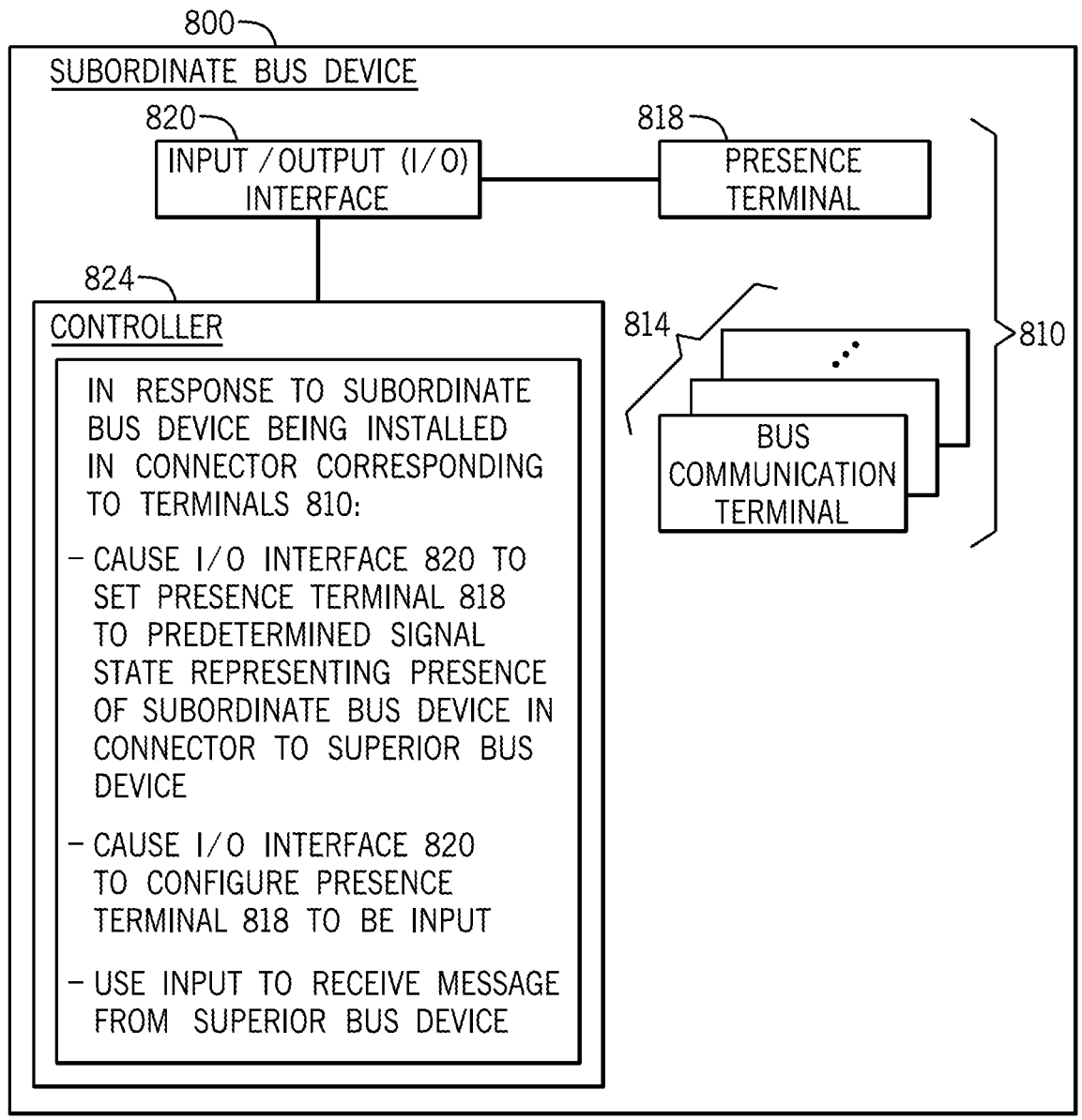
FIG. 8 is a schematic diagram of a subordinate bus device that uses a presence terminal to receive a message from a superior bus device according to an example implementation.

Referring to FIG. 8, in accordance with example implementations, a subordinate bus device 800 includes a plurality of terminals 810; and an input/output (I/O) interface 820; and a controller 824. The plurality of terminals 810 are to be connected to corresponding terminals of a connector in response to the subordinate bus device 800 being installed in the connector. The plurality of terminals 810 includes terminals 814 to communicate with a bus and a presence terminal 818. The I/O interface 820 is associated with the presence terminal 818. The controller 824, in response to the subordinate bus device 800 being installed in the connector, causes the I/O interface to set the presence terminal to a predetermined signal state representing the presence of the bus device in the connector to a superior bus device; cause the I/O interface to configure the presence terminal to be an input; and use the input to receive a message from the superior bus device.

Figure 9:
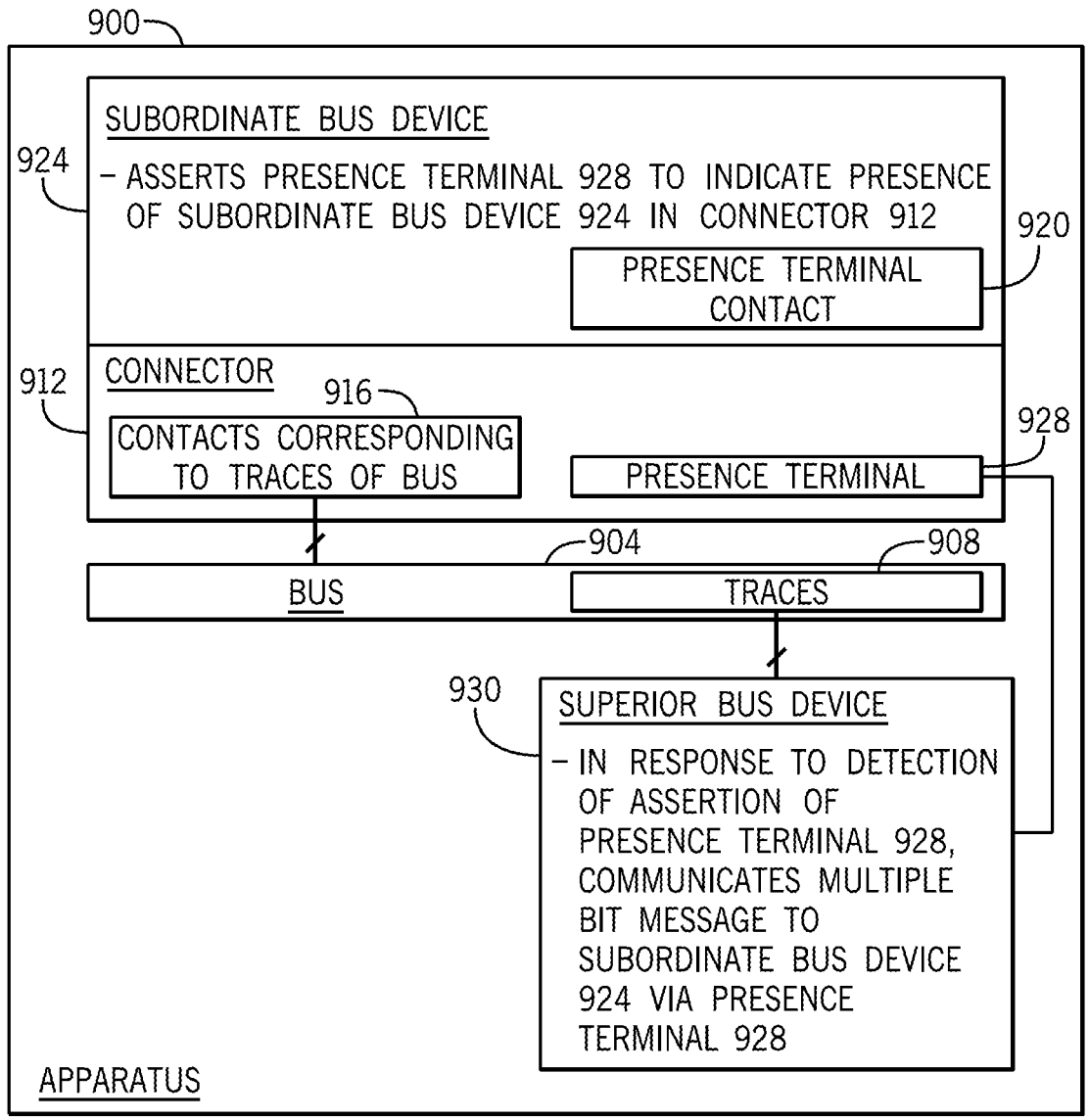
FIG. 9 is a schematic diagram of an apparatus to communicate a multiple bit message to a subordinate bus device via a presence terminal according to an example implementation.

Referring to FIG. 9, in accordance with example implementations, an apparatus 900 includes a bus 904; a connector 912; a subordinate bus device 924 in the connector 912; and a superior bus device 930. The connector 912 includes contacts 916, which correspond to traces of the bus and a presence terminal 928. The subordinate bus device 924 includes a presence terminal contact 920 that corresponds to the presence terminal 928, and the subordinate bus device 924 asserts the presence terminal 928 to indicate presence of the subordinate bus device 924 in the connector 912. The superior bus device 930 is coupled to the contacts 916 corresponding to the traces of the bus and is coupled to the presence terminal 928. The superior bus device 930, in response to the detection of the assertion of the presence terminal 928 by the subordinate bus device 924, communicates a multiple bit message to the subordinate bus device 924 via the presence terminal 928.

Other variations are contemplated, which are within the scope of the appended claims. As an example, in accordance with further example implementations, due to a potentially relatively small pinout of the chassis controller 160, the enclosure 110 (FIG. 1) may include one or multiple I/O expanders to communicate with the presence terminals of the subordinate bus devices 120. More specifically, instead of one dedicated terminal of the chassis controller 160 being connected to one of the presence terminals, a pair of terminals of the chassis controller 160 may be coupled to clock and data lines of a serial bus (an I$^2$C bus, for example); and one or multiple I/O expanders may be connected to the serial bus and be addressable through communications on the serial bus.

The I/O expander has a set of parallel GPIO-based terminals that may be updated in synchronization with the serial bus clock, and the GPIO-based terminals may be connected to respective subordinate bus presence terminals. The chassis controller 160 may communicate with the I/O expander to individually set the GPIO-based terminals of the I/O expander to inputs or outputs, receive data representing input received via the GPIO-based terminals, and provide data representing output for the GPIO-based terminals. It is noted that this arrangement preserves the star network topology for the presence terminal-based side channel communications.

In accordance with example implementations, communicating the data over the bus includes communicating a message over the bus, which is addressed to the bus device; and communicating side channel data with the bus device includes communicating data that represents a hash value that corresponds to the message. This has the advantage of allowing relatively low bandwidth data (a hash value) to be communicated over a single pin side channel to authenticate communications over a bus.

In accordance with example implementations, communicating the message includes communicating data representing a hash value of a certificate, a hash value of a certificate chain, a hash value of a portion of a certificate, or a hash value of a portion of the certificate chain. This has the advantage of allowing relatively low bandwidth data (a hash value) to be communicated over a single pin side channel to authenticate communications over a bus without resorting to communicating the entire certificate or portion thereof across the side channel.

In accordance with example implementations, communicating the side channel data includes communicating data representing a cryptographic key to be used to decrypt the data communicated over the bus. This has the advantage of allowing relatively low bandwidth data (a cryptographic key) to be communicated over a single pin side channel to authenticate communications over a bus.

In accordance with example implementations, communicating the data over the bus includes communicating a message over the bus addressed to the bus device; the message includes an identifier; and communicating side channel data with the bus device includes the data representing the identifier. This has the advantage of allowing relatively low bandwidth data (e.g., an arbitrary number, such as a random or pseudorandom number) to be communicated over a single pin side channel to authenticate communications over a bus.

In accordance with example implementations, communicating the side channel data includes communicating a message transmission sequence to the presence terminal, and the message transmission sequence includes a message portion that includes bits representing a message, a multiple bit synchronization portion, and a multiple bit length portion specifying the length of the message portion. This has the advantage of making the side channel communication robust and allows relatively simple verification of whether or not the communication of the transmission sequence is successful.

In accordance with example implementations, communicating the message transmission sequence includes communicating a multiple bit lead in portion preceding the synchronization section and a checksum portion proceeding the message portion. This has the advantage of making the side channel communication robust and allows relatively simple verification of whether or not the communication of the transmission sequence is successful.

In accordance with example implementations, communicating the side channel data includes communicating a multiple bit transmission sequence to the presence terminal; and determining whether the bus device acknowledges receipt of the multiple bit transmission sequence based on a signal state associated with the presence terminal. This has the advantage of providing a robust way to signal whether the transmission sequence should be retransmitted.

In accordance with example implementations, the bus device asserts the signal state to represent presence of the bus device and initiate the communication of the transmission sequence by the controller; the signal state is re-asserted by the bus device to acknowledge receipt of the transmission sequence; and the controller repeats communicating the transmission sequence in response to the signal state not being re-asserted by the bus device to acknowledge receipt of the transmission sequence. This has the advantage of providing a robust way for communicating the transmission sequence to the bus device.

In accordance with example implementations, the controller repeats communicating the transmission sequence in response to the signal state not being re-asserted by the bus device to acknowledge receipt of the transmission sequence. This has the advantage of making the side channel communication robust and allows relatively simple verification of whether or not the communication of the transmission sequence is successful.

In accordance with example implementations, the controller, in response to the detection of the signal state, measures a predetermined delay indicator; and in response to the measuring of the predetermined delay indicator, the controller communicates the side channel data with the bus device. This has the advantage of allowing two devices, which are not synchronized by a clock signal, to coordinate to communicate data over the presence terminal.

While the present disclosure has been described with respect to a limited number of implementations, those skilled in the art, having the benefit of this disclosure, will appreciate numerous modifications and variations therefrom. It is intended that the appended claims cover all such modifications and variations.

What is claimed is:

1. A method comprising:
a controller detecting a signal state of a presence terminal associated with a bus device, wherein the signal state is set by the bus device to indicate presence of the bus device in a connector, and the connector is connected to a bus;
the controller communicating data over the bus, wherein communicating data over the bus comprises communicating a message over the bus addressed to the bus, the message comprising data representing a hash value of a certificate, a hash value of a certificate chain, a hash value of a portion of a certificate, or a hash value of a portion of a certificate chain; and
in response to detecting the signal state, the controller communicating side channel data to the bus device to authenticate the data communicated over the bus as being provided by the controller, wherein communicating the side channel data to the bus device comprises providing a signal to the presence terminal representing the side channel data.

2. The method of claim 1, wherein:
communicating side channel data with the bus device comprises communicating data representing a hash value corresponding to the message.

3. The method of claim 1, wherein communicating the side channel data comprises communicating data representing a cryptographic key to be used to decrypt the data communicated over the bus.

4. The method of claim 1, wherein:
communicating the data over the bus comprises communicating a message over the bus addressed to the bus device;
the message comprises an identifier; and
communicating side channel data with the bus device comprises data representing the identifier.

5. The method of claim 4, wherein the identifier comprises a random number or a pseudorandom number.

6. The method of claim 1, wherein communicating the side channel data comprises communicating a message transmission sequence to the presence terminal, wherein the message transmission sequence comprises a message portion comprises bits representing a message, a multiple bit synchronization portion, and a multiple bit length portion specifying the length of the message portion.

7. The method of claim 6, wherein communicating the message transmission sequence further comprises communicating a multiple bit lead in portion preceding the synchronization section and a checksum portion proceeding the message portion.

8. The method of claim 1, wherein communicating the side channel data further comprises:
communicating a multiple bit transmission sequence to the presence terminal; and
determining whether the bus device acknowledges receipt of the multiple bit transmission sequence based on a signal state associated with the presence terminal.

9. The method of claim 8, wherein:
the bus device asserts the signal state to represent presence of the bus device and initiate the communication of the transmission sequence by the controller;
the signal state is re-asserted by the bus device to acknowledge receipt of the transmission sequence; and
the method further comprising the controller repeating communicating the transmission sequence in response to the signal state not being re-asserted by the bus device to acknowledge receipt of the transmission sequence.

10. The method of claim 1, further comprising:
the controller, in response to the detection of the signal state, measuring a predetermined delay indicator; and
in response to the measuring of the predetermined delay indicator, the controller communicating the side channel data with the bus device.

11. The method of claim 1, wherein the bus device comprises a given bus device of a plurality of bus devices installed in corresponding connectors that are connected to the bus, the method further comprising:
the controller communicating additional side channel data with the bus devices of the plurality of bus devices other than the given bus device using side channels that include additional presence terminals.

12. A subordinate bus device, comprising:

a plurality of terminals to be connected to corresponding plurality of terminals of a connector in response to the subordinate bus device being installed in the connector, wherein the plurality of terminals of the connector comprises terminals to communicate with a bus and a presence terminal;

an input/output (I/O) interface associated with the presence terminal; and a controller to, in response to the subordinate bus device being installed in the connector:

set the presence terminal to a predetermined signal state representing presence of the subordinate bus device in the connector to a superior bus device;

cause the I/O interface to configure the presence terminal to be an input; and use the input to receive a message from the superior bus device, wherein the message contains data representing a hash value and the controller uses the hash value to validate a certificate or validate a public key portion of the certificate, and wherein the certificate is communicated by the superior bus device via the bus.

13. The subordinate bus device of claim 12, wherein the controller:

measures a delay in association with the setting of the presence terminal to the predetermined signal state and causes the I/O interface to configure the presence terminal to be the input in response to the expiration of the delay; and causes the I/O interface to configure the presence terminal to be an output and signals the superior bus device using the output to acknowledge receipt of the message.

14. The subordinate bus device of claim 12, wherein:

the message contains data representing a cryptographic key; and the controller uses the cryptographic key to decrypt a message communicated by the superior bus device via the bus.

15. An apparatus comprising:

a bus comprising traces;

a connector, wherein the connector comprises contacts corresponding to traces of the bus and a presence terminal;

a subordinate bus device in the connector, wherein the subordinate bus device comprises a presence terminal contact corresponding to the presence terminal, and the subordinate bus device asserts the presence terminal to indicate presence of the subordinate bus device in the connector; and a superior bus device coupled to the contacts corresponding to the traces of the bus and coupled to the presence terminal, wherein the superior bus device, in response to detection of the assertion of the presence terminal by the subordinate bus device, communicates a multiple bit message to the subordinate bus device via the presence terminal, the multiple bit message comprising data representing a hash value used by the subordinate bus device to validate a certificate or public key portion of the certificate, wherein the certificate is communicated by the superior bus device via the bus.

16. The apparatus of claim 15, wherein the subordinate bus device communicates a signal to the presence terminal representing content of the message and a clock signal encoded into the content of the message.

17. The apparatus of claim 15, wherein:

the message contains data representing a cryptographic key; and the subordinate bus device uses the cryptographic key to decrypt a message communicated by the superior bus device via the bus.

* * * * *